Figure 1:
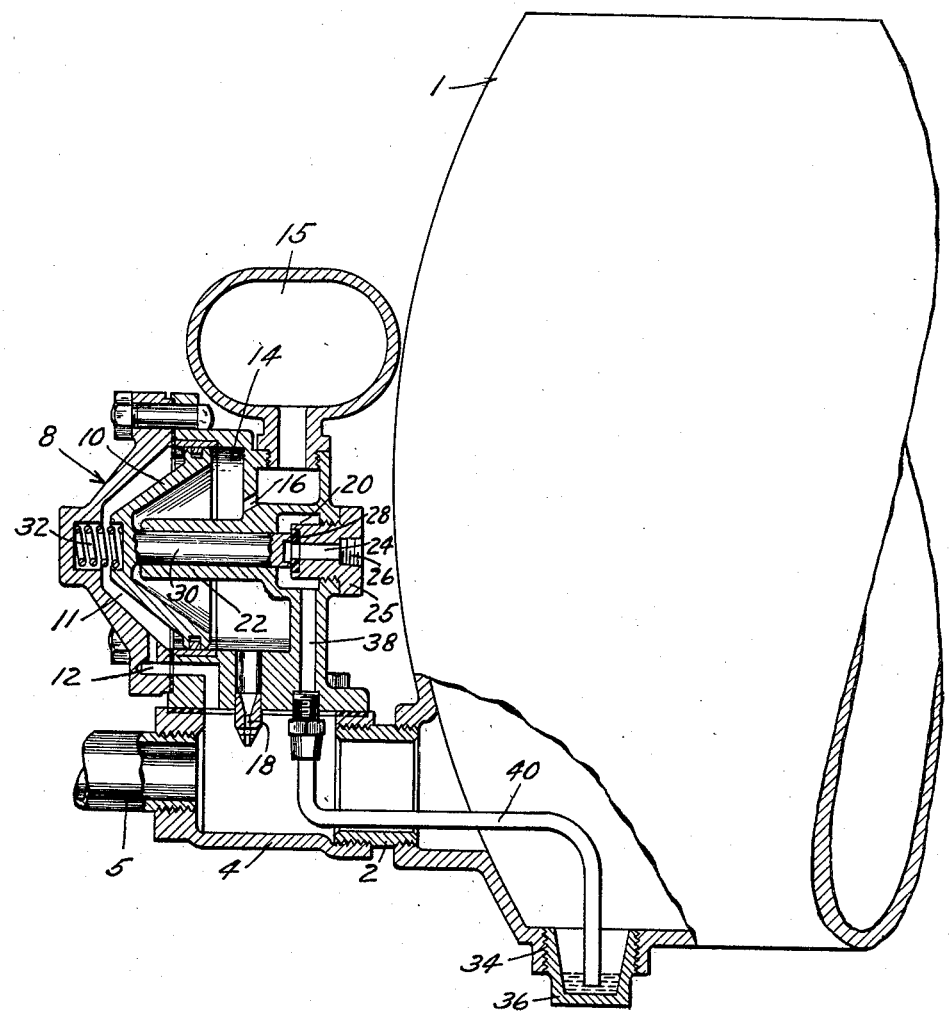

Oct. 24, 1939.　　　B. S. AIKMAN　　　2,177,510
AUTOMATIC DRAIN VALVE
Filed June 24, 1937　　　3 Sheets-Sheet 1

INVENTOR
BURTON S. AIKMAN
BY *Wm. H. Cady*
ATTORNEY

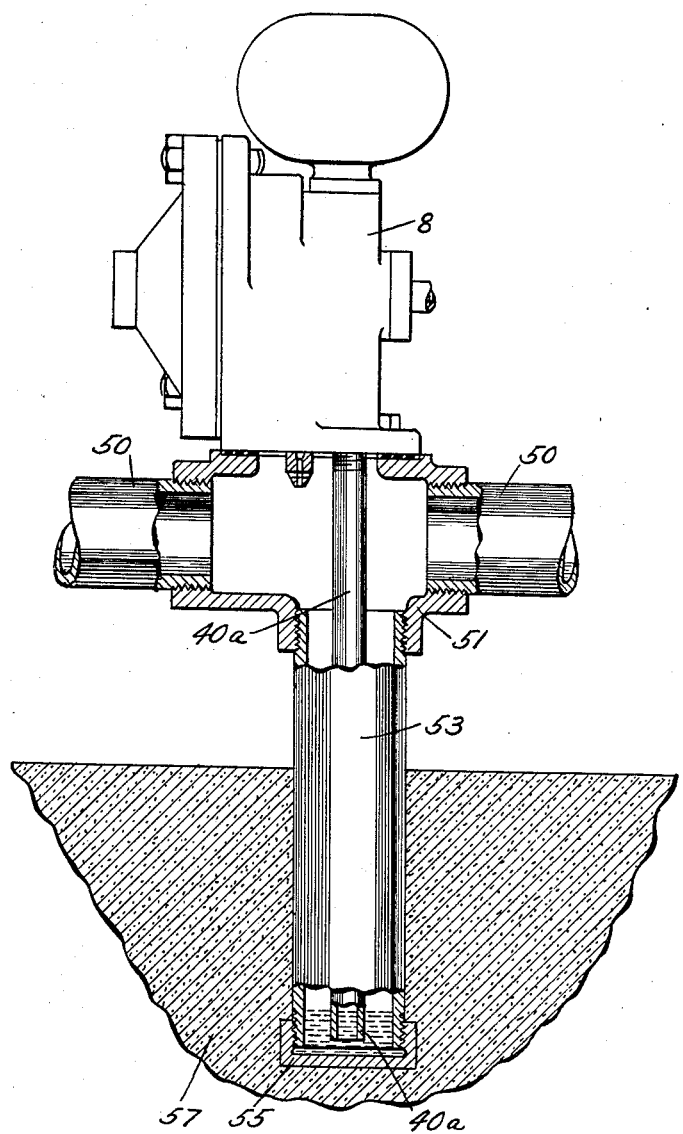

Oct. 24, 1939.　　　B. S. AIKMAN　　　2,177,510
AUTOMATIC DRAIN VALVE
Filed June 24, 1937　　　3 Sheets-Sheet 3
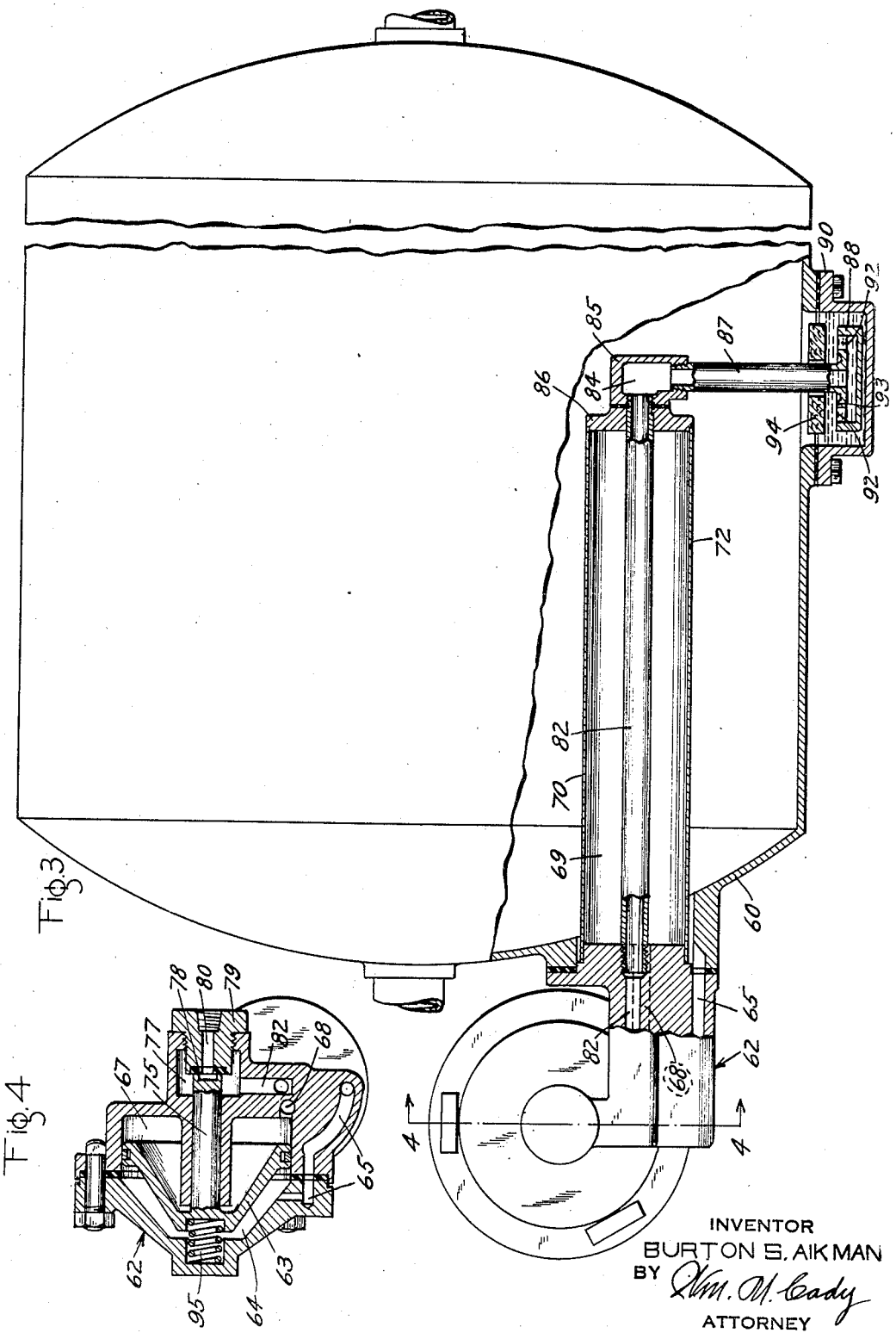
INVENTOR
BURTON S. AIKMAN
BY
Wm. M. Cady
ATTORNEY Patented Oct. 24, 1939

2,177,510

UNITED STATES PATENT OFFICE 2,177,510

AUTOMATIC DRAIN VALVE

Burton S. Aikman, Wilkinsburg, Pa., assignor to The Westinghouse Air Brake Company, Wilmerding, Pa., a corporation of Pennsylvania Application June 24, 1937, Serial No. 150,098

5 Claims. (Cl. 303—88)

This invention relates to an automatic drain valve which is adapted to be employed in a fluid pressure system to release water which accumulates in the system.

In the operation of fluid pressure systems, such as fluid pressure brake systems, air from the atmosphere is compressed and is stored in a reservoir or receiver from which fluid is withdrawn during operation of the brake equipment. As a result of the supply of fluid under pressure to and the release of fluid under pressure from the reservoir, water is deposited in the reservoir, and unless it is periodically drained away, it accumulates in the reservoir and reduces the volume of the reservoir, while it may freeze and cause injury to the equipment.

It is an object of this invention to provide an improved automatic drain valve.

A further object of the invention is to provide an automatic drain valve which can be readily applied to reservoirs now in use.

Another object of the invention is to provide an automatic drain valve which can be applied to a reservoir without necessitating substantial changes in the reservoir, or in the pipes connected thereto.

A further object of the invention is to provide an improved automatic drain valve which can be applied to a pipe line for transporting fluid under pressure, the drain valve being adapted to release liquid which collects in the pipe line.

Another object of the invention is to provide an improved automatic drain valve which has all of its operating parts located above the level of the liquid in the system with which the drain valve is associated so that the drain valve will not be damaged in the event that the water in the system freezes.

And other objects of the invention and features of novelty will be apparent from the following description taken in connection with the accompanying drawings, in which:

Fig. 1 is a view, largely in section, of a reservoir equipped with the improved automatic drain valve provided by this invention, Fig. 2 is a view, largely in section, of a pipe line equipped with the automatic drain valve shown in Fig. 1, Fig. 3 is a view, largely in section, of a reservoir equipped with a modified form of automatic drain valve embodying this invention, and Fig. 4 is a sectional view taken substantially along the line 4—4 on Fig. 3.

Referring to Fig. 1 of the drawings, there is shown therein a reservoir 1, which may be of any suitable construction, and is a part of a fluid pressure system, such as a vehicle fluid pressure brake system. The reservoir 1 has a threaded opening in an end wall thereof in which is secured one end of a nipple 2, while the other end of this nipple has secured thereon a hollow body 4 having a threaded opening therein to which is connected one end of a pipe 5 leading from a compressor, not shown.

The upper face of the body 4 is open, and the automatic drain valve provided by this invention is secured over this opening.

The drain valve provided by this invention is indicated generally by the reference numeral 8, and comprises a body having a bore therein in which is mounted a movable abutment or movable element in the form of a piston 10, having at one side an operating chamber 11 which is open to the pipe 5 and the reservoir 1 through a passage 12 of relatively large flow capacity.

The piston 10 has at the other face thereof a chamber 14 which is open to a timing or volume reservoir 15 through a passage 16. The chamber 14 is connected to the pipe 5 and the reservoir 1 through a passage having interposed therein a choke plug having a restricted passage 18 therethrough so that fluid under pressure flows between the chamber 14 and the timing reservoir 15 and the pipe 5 or the reservoir 1 only at a restricted rate.

The body of the drain valve 8 has a valve chamber 20 formed therein, while the wall which separates the valve chamber 20 from the chamber 14 has a central portion indicated at 22 and of relatively great thickness. The central portion 22 has a bore therein, while the wall of the valve chamber 20 has a discharge passage 24 extending therethrough and opening to the valve chamber 20 at a point substantially opposite the bore in the central portion 22. The discharge passage 24 is formed in a threaded plug 25 which is secured in a threaded opening in a wall of a valve chamber 20, while the end of the passage 24 adjacent the atmosphere is surrounded by pipe threads 26 adapted to receive a drain pipe, not shown, which may lead to a suitable drain. The member 25 has an annular recess therein surrounding the other end of the passage 24, and a sealing gasket 28 is mounted in this recess.

The piston 10 has formed integral therewith a stem 30 which extends through the bore in the wall central portion 22, and is provided with an annular seat rib adapted to seat upon the sealing gasket 28 to cut off communication between the valve chamber 20 and the discharge passage 24.

The stem 30 closely fits the bore in the central portion 22, and because of the relatively great length of the bore in the central portion 22, the stem 30 substantially seals this opening to prevent flow of fluid between the chamber 14 and the valve chamber 20.

The piston 10 is yieldingly urged to the right, as viewed in Fig. 1 of the drawings, by means of a coil spring 32 mounted in the chamber 11.

The reservoir 1 has a threaded opening 34 in the lowermost portion thereof and adjacent the opening in which the nipple 2 is secured. A threaded cup-shaped member 36 is secured in the threaded opening 34, and is arranged to receive any liquid which collects in the reservoir 1 during operation of the system.

The body of the automatic drain valve 8 has a passage 38 formed therein and communicating with the valve chamber 20, while a pipe 40 is connected to the passage 38 and extends through the nipple 2 and into the reservoir 1 so that the end of this pipe is located within the cup member 36.

In operation, on the supply of fluid under pressure through the pipe 5 to the reservoir 1, fluid flows at a rapid rate through the passage 12 to the chamber 11 at the face of the piston 10 to increase the pressure of the fluid in this chamber substantially as rapidly as the pressure of the fluid in the reservoir 1 is increased. On this increase in the pressure of the fluid in the chamber 11, force is exerted through the piston 10 and the stem 30 to press the seat rib on the stem 30 against the sealing gasket 28 so that fluid under pressure supplied from the reservoir 1 by way of the pipe 40 and the passage 38 to the chamber 20 cannot escape to the atmosphere by way of the discharge passage 24.

In addition, upon the supply of fluid under pressure through the pipe 5 to the reservoir 1, fluid flows at a restricted rate through the restricted passage 18 to the chamber 14 and the timing reservoir 15, and gradually increases the pressure of the fluid in the chamber 14 and in the reservoir 15 to the pressure of the fluid in the reservoir 1 and in the chamber 11.

When the pressure of the fluid in the chamber 14 has been increased to the pressure of the fluid in the chamber 11, the spring 32 operates through the piston 10 and the stem 30 to maintain the seat rib on the stem 30 in the seated position, while the fluid under pressure present in the chamber 11 operating upon an area of the piston 10 equal to the area within the seat rib on the end of the stem 30 also exerts force upon the stem to hold the seat rib thereon in the seated position, and thereby prevent the release of fluid from the valve chamber 20 through the discharge passage 24.

Any liquid, such as water, which condenses from the air supplied to the reservoir 1, will flow by gravity to the lower portion of the reservoir 1, and thence to the chamber within the threaded cup member 36 so as to seal the end of the pipe 40.

On a subsequent decrease in the pressure of the fluid in the reservoir 1, which may be occasioned by the withdrawal of fluid therefrom, fluid flows from the chamber 11 through the passage 12 at a rapid rate to the reservoir 1 to reduce the pressure of the fluid in the chamber 11 substantially as rapidly as the pressure of the fluid in the reservoir 1 is decreased.

At this time fluid under pressure cannot flow from the chamber 14 and the timing reservoir 15 through the choke 18 to reduce the pressure of the fluid in the chamber 14, and in the reservoir 15, as rapidly as the pressure of the fluid in the chamber 11 is reduced, and, accordingly, fluid at a higher pressure is present in the chamber 14 and exerts force upon the piston 10 to move it against the spring 32, while the seat rib on the end of the stem 30 is moved away from the sealing gasket 28.

When the stem 30 is moved away from the sealing gasket 28, the fluid present in the valve chamber 20 may escape to the atmosphere or to a drain through the passage 24, and on this reduction in the pressure of the fluid in the valve chamber 20, the fluid under pressure in the reservoir 1 acting upon the surface on the liquid collected in the cup 36, forces the liquid in this cup upwardly through the pipe 40 and the passage 38 to the valve chamber 20, and thence through the discharge passage 24 to the atmosphere or to a drain.

After a time interval, the pressure of the fluid in the chamber 14, and in the reservoir 15, will have reduced by flow therefrom through the choke 18 substantially to the pressure of the fluid present in the reservoir 1, and in the chamber 11 at the opposite face of the piston 10.

When the pressure of the fluid in the chamber 14 has been reduced substantially to this value, the piston 10 is moved by the spring 32 so that the seat rib on the stem 30 engages the sealing gasket 28 to cut off communication between the pipe 40 and the release passage 24.

The volume of the chamber 14 and the reservoir 15, and the flow capacity of the choke 18, are proportioned so that the pressure of the fluid in the chamber 14 will not be reduced to a value to permit the piston 10 to be moved by the spring 32 to cut off communication through the discharge passage 24 until the release of liquid through this passage has continued for a time interval long enough to insure that all, or substantially all, of the liquid collected in the lower portion of the reservoir 1 has been discharged therefrom.

The chamber 14 and the reservoir 15, and the choke 18, are also proportioned so that the pressure of the fluid in the chamber 14 and the reservoir 15 will reduce to a value to permit the piston 10 to move the stem 30 into engagement with the sealing gasket 28 substantially as soon as all of the liquid collected in the cup 36 has been discharged therefrom so that there will be no unnecessary release of fluid from the reservoir 1.

If there is another reduction in the pressure of the fluid in the reservoir 1, fluid will flow from the chamber 11 to the passage 12 at a rapid rate to reduce the pressure of the fluid in the chamber 11 to the pressure present in the reservoir 1, while the higher pressure of the fluid in the chamber 14 and the reservoir 15 will again move the piston against the spring 32, and move the stem 30 away from the sealing gasket 28, to again open communication from the valve chamber 20 through the discharge passage 24 so that any water which has accumulated in the lower portion of the reservoir 1 will be discharged therefrom.

After a time interval, the pressure of the fluid in the chamber 14 and the reservoir 15 will have reduced by flow through the choke 18 so that the pressure of the fluid at the opposite sides of the piston 10 are substantially equal, and the piston 10 is moved by the spring 32 and moves the stem 30 into engagement with the sealing gasket 28 to cut off the further release of fluid from the reservoir 1.

On a subsequent increase in the pressure of the fluid in the reservoir 1 by the supply of fluid thereto through the pipe 5, fluid flows by way of the passage 12 to the chamber 11 at the face of the piston 10 to increase the pressure of the fluid in this chamber, while fluid flows through the restricted passage 18 to the chamber 14 and the reservoir 15 to increase the pressure of the fluid therein substantially to reservoir pressure, with the result that the drain valve 8 is again ready to release fluid from the reservoir 1 on a subsequent reduction in the pressure of the fluid therein.

It will be seen that the automatic drain valve provided by this invention is constructed and arranged so that it can be quickly applied to a reservoir of standard construction without making any alterations in the reservoir.

It will be seen also that the drain valve may be interposed in the supply pipe leading from a compressor to the reservoir so that the heat of compression of the fluid flowing through the pipe will be imparted to the body of the drain valve, and will prevent freezing of any moisture present therein and thereby prevent the drain valve being rendered inoperative.

In Fig. 2 of the drawings there is shown a means by which the automatic drain valve provided by this invention and shown in Fig. 1 may be applied to a pipe line, such as the yard line in a railway freight yard, and through which fluid under pressure, such as compressed air, is transported for considerable distances. Moisture may be deposited at different points in a pipe line of this kind, and if it is not removed it may freeze, or it may injure the apparatus supplied with fluid under pressure from the pipe line. The drain valve provided by this invention may be interposed in the pipe line at one or more convenient points, either in the main line, or in a branch line.

As shown in Fig. 2 of the drawings, the pipe line, which is indicated at 50, extends in a generally horizontal plane, and has interposed therein a hollow body 51 having threaded openings in the side walls thereof in which are secured sections of the pipe forming the pipe line 50.

The body 51 has in the lower wall thereof a threaded opening in which is secured an end of a substantially vertically extending section of pipe 53, the lower end of which is closed by a cap 55. The lower portion of the pipe 53 may be embedded in suitable material, such as concrete indicated at 57, to prevent freezing of moisture which collects in the pipe 53 and to provide a foundation for the pipe 53 so that this pipe can support the pipe line 50.

The upper face of the body 51 is open, while a drain valve 8 provided by this invention, which is identical in construction and operation with the drain valve 8 shown in Fig. 1 and described in detail above, is secured over this opening in the body 51. The drain valve 8 shown in Fig. 2 of the drawings has a pipe 40a secured thereto in communication with the passage 38 therein, while the pipe 40a extends within the pipe 53 substantially to the lower end thereof.

In the operation of this system, water or moisture which condenses from the fluid flowing through the pipe line 50, will flow to the chamber within the body 51, and thence by gravity to the lower portion of the pipe 53. In addition, fluid under pressure from the pipe line 50 will flow to the chambers at the opposite sides of the piston in the drain valve 8.

On a subsequent reduction in the pressure of the fluid in the pipe line 50, which may be occasioned by the withdrawal of fluid from this pipe line, there will be a reduction in the pressure of the fluid in the chamber at one face of the piston of the drain valve 8, and communication will be opened between the pipe 40a and the atmosphere or a drain, with the result that the fluid under pressure operating upon the surface of the liquid contained in the pipe 53 will force the liquid upwardly in the pipe 40a, and thence to the passage opened through the drain valve 8. After a predetermined time interval, the drain valve 8 will operate, as described in detail above, to cut off the release of fluid through the pipe 40a, while this cycle of operation will be repeated on each reduction in the pressure of the fluid in the pipe line 50.

It will be seen that the drain valve provided by this invention may be interposed in a pipe line at any convenient point, and that it will operate automatically in response to variations in the pressure of the fluid in the pipe line to drain off liquid which accumulates in the pipe line.

In Figs. 3 and 4 of the drawings there is shown a reservoir 60 equipped with a modified form of automatic drain valve embodying this invention. This drain valve is similar to that shown in Figs. 1 and 2 of the drawings, but differs therefrom as it has a timing reservoir which is located within the reservoir 60 with which the drain valve is associated, and as it has means responsive to the level of the liquid in the reservoir 60 for controlling communication through the discharge passage controlled by the drain valve to prevent continued release of fluid through the passage after the liquid in the reservoir has been reduced to the desired level.

The reservoir 60 shown in Fig. 3 of the drawings has an opening in an end thereof which is surrounded by a mounting face against which is secured the automatic drain valve which is indicated generally by the reference numeral 62. The drain valve 62 has a body having a mounting flange formed thereon and adapted to be secured against the mounting face on the reservoir 60, while this body has a bore therein in which is mounted a piston 63 having at one face thereof a chamber 64 which is constantly connected by way of a passage 65 with a port in the face of the flange on the body of the valve device, which, when the body of the valve device is secured against the mounting face on the reservoir 60, is in alignment with a port open to the chamber within the reservoir 60. The passage 65 is of relatively large flow capacity so that the fluid in the chamber 64 is always maintained substantially at the pressure of the fluid in the reservoir 60.

The piston 63 has at the other face thereof a chamber 67 which is constantly connected by way of a passage 68 with the chamber 69 within a tubular shell 70, which is secured on the body of the drain valve 62 and is adapted to contain fluid under pressure.

The shell 70 has a restricted passage indicated at 72 extending through the wall thereof and through which fluid under pressure may flow at a restricted rate from the reservoir 60 to the chamber 69 within the shell 70.

The piston 63 has formed integral therewith a stem 75 mounted in a bore in the wall of the chamber 67 and extending into a valve chamber 77 formed in the body of the drain valve. The stem 75 has an annular seat rib formed on the end thereof which is adapted to seat upon a gasket 78 carried by a threaded plug 79 and surrounding a discharge passage 80 in this plug.

The chamber 77 is connected by way of a passage and pipe 82 with the chamber 84 within a member 85 which is secured on the head 86 of the shell 70.

The member 85 has secured thereto a pipe 87 having a hollow head 88 secured on the lower end thereof and disposed within a cup 90 secured on the lower wall of the reservoir 60 surrounding an opening in the reservoir wall. The head 88 has thereon a seating face 93 having a plurality of ports 92 opening therein, while a float 94 is mounted upon the pipe 87 and is adapted to seat upon the seating face 93 on the head 88.

A spring 95 is provided and is mounted in the chamber 64 and yieldingly urges the piston 63 and the stem 75 to the right, as viewed in Fig. 4 of the drawings, so that the seat rib on the end of the stem 75 seats upon the gasket 78.

In operation, this embodiment of the invention is similar to the preceding embodiment, and on the supply of fluid under pressure to the reservoir 60, fluid flows therefrom by way of the passage 65 to the chamber 64 at one face of the piston 63 to increase the pressure of the fluid in this chamber substantially as rapidly as the pressure of the fluid in the reservoir 60 is increased.

In addition, upon the supply of fluid under pressure to the reservoir 60, fluid flows therefrom at a restricted rate through the restricted passage 72 to the chamber 69 within the shell 70, and therefrom by way of the passage 68 to the chamber 67 at the opposite face of the piston 63. After a time interval, the pressure of the fluid in the chamber 69, and in the chamber 67, will have increased substantially to the pressure in the reservoir 60, and thereafter the spring 95 maintains the end of the stem 75 in engagement with the sealing gasket 78.

The moisture which condenses from the fluid under pressure supplied to the reservoir 60 will flow by gravity to the lower portion of the reservoir, and thence to the chamber within the cup 90, and will lift the float 94 away from the seating face 93 on the member 88 so that the liquid may flow through the ports 92 to the passage within the pipe 87.

On a subsequent reduction in the pressure of the fluid in the reservoir 60, fluid under pressure may flow from the chamber 64 through the passage 65 to the reservoir 60 so that the pressure of the fluid in the chamber 64 is reduced substantially as rapidly as the pressure of the fluid in the reservoir is reduced.

At this time fluid under pressure flows from the chamber 67 and the chamber 69 through the restricted port 72 to the reservoir 60, but because of the restricted flow capacity of the port 72, the pressure of the fluid in the chambers 67 and 69 is not reduced as rapidly as the pressure of the fluid in the reservoir 60 is reduced, and, as a result, the pressure of the fluid in the chambers 67 and 69 is maintained somewhat higher than that present in the chamber 64. The fluid at the higher pressure present in the chamber 67 will thereupon move the piston 63 against the spring 95, and move the stem 75 so that the end thereof no longer engages the sealing gasket 78.

On movement of the stem 75 away from the sealing gasket 78, communication is opened between the valve chamber 77 and the atmosphere through the discharge passage 80, and the fluid under pressure in the reservoir 60 acting upon the surface of the liquid in the cup 90 forces the liquid through the ports 92 and upwardly in the passage in the pipe 87 to the chamber 84, from which the liquid flows by way of the pipe and passage 82 to the valve chamber 77, and thence through the discharge passage 80.

As a result of the flow of liquid from the cup member 90, and from the lower portion of the reservoir 60, the level of the liquid is reduced, while the float 94 will approach the seating face 93 on the member 88. When the liquid in the cup member 90 is reduced to a predetermined relatively low level, the float 94 seats upon the seating face 93 on the seat member 88, and cuts off communication between the reservoir 60 and the ports 92 to thereby prevent undesired flow of gaseous fluid from the reservoir 60 through the ports 92, and thus to the pipe 87 and to the atmosphere through the drain valve.

After a time interval, the pressure of the fluid in the chamber 67 at the face of the piston 63, and in the chamber 69 within the tube 70, will have been reduced by flow through the restricted port 72 substantially to the pressure in the reservoir 60, and in the chamber 64 at the opposite face of the piston 63, and the spring 95 will thereupon move the piston 63 so that the end of the stem 75 again engages the sealing gasket 78 to cut off communication between the valve chamber 77 and the discharge passage 80.

Upon a subsequent reduction in the pressure of the fluid in the reservoir 60, the drain valve 62 operates again, as described above, to open a communication through which liquid may be released from the reservoir 60, and to maintain the communication open for a predetermined time interval, while the float 94 is operated on an increase in the level of the liquid in the reservoir 60 to permit liquid to flow through the ports 92 to the drain valve 62 to be released from the reservoir 60, while the float 94 operates to cut off communication through this passage when the liquid in the reservoir 60 has been reduced to a predetermined level.

The volume of the chambers 67 and 69, and the flow capacity of the restricted port 72, are proportioned so that the piston 63 will maintain the stem 75 away from the gasket 78 for a time interval long enough to permit all of the liquid which has accumulated in the reservoir 60 to drain therefrom, while the float 94 operates to cut off the release of fluid from the reservoir through the drain valve as soon as substantially all of the liquid has been released from the reservoir 60 to thereby prevent depletion of the supply of fluid in the reservoir.

It will be seen that the automatic drain valve provided by this embodiment of the invention has the timing reservoir or chamber positioned within the reservoir with which the drain valve is associated so that there is minimum of projecting parts disposed outside of the reservoir.

While several embodiments of the improved automatic drain valve provided by this invention have been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. In an automatic drain valve for use with a fluid pressure system, a body having a valve chamber therein, said body having a cylinder bore therein and having a wall separating said valve chamber and said cylinder bore, said wall having a central portion of relatively great thickness, said central portion having an opening therein, the wall of said valve chamber having a discharge passage therein opening to said valve chamber at a point substantially opposite the opening in said central portion, a piston mounted in said cylinder bore and having a stem mounted in the opening in said central portion and closely fitting said opening, said stem having a seating face thereon adapted to engage a seat on said valve chamber wall surrounding said discharge passage, the piston being subject to the opposing pressures of the fluid in chambers at the opposite faces thereof, a communication through which fluid may flow between said system and one of said chambers at one rate, a communication through which fluid may flow between said system and the other of said chambers at a substantially different rate, and a communication through which liquid which accumulates in said system may be supplied to said valve chamber.

2. In an automatic drain valve for use in a fluid pressure system, a timing reservoir, a body having associated therewith a movable abutment subject on one face to the pressure of the fluid in a chamber, a communication through which fluid under pressure may flow between said chamber and said system at a rapid rate, said abutment being subject on the opposite face to the pressure of fluid in the timing reservoir, a communication through which fluid may flow at a restricted rate between said system and said timing reservoir, valve means operated by said abutment and controlling a passage through which liquid accumulated in said system may be released, and means subject to and operated on a predetermined reduction in the level of the liquid in said system to cut off communication through said passage.

3. In an automatic drain valve for use with a fluid pressure system, a body having a valve chamber therein, said body having a cylinder bore therein and having a wall separating said valve chamber and said cylinder bore, said wall having a central portion of relatively great thickness, said central portion having an opening therein, the wall of said chamber having a discharge passage therein opening to said valve chamber at a point substantially opposite the opening in said central portion, a piston mounted in said cylinder bore and having a stem mounted in the opening in said central portion and closely fitting said opening, said stem having a seating face thereon adapted to engage a seat on said valve chamber wall surrounding said discharge passage, the piston being subject to the opposing pressures of the fluid in chambers at the opposite faces thereof, a communication through which fluid may flow between said system and one of said chambers at one rate, a communication through which fluid may flow between said system and the other of said chambers at a substantially different rate, a communication through which liquid which accumulates in said system may be supplied to said valve chamber, and means responsive to the level of the liquid in said system for also controlling said communication.

4. In an automatic drain valve for use with a fluid pressure system having a sump therein in which liquid may collect, the drain valve comprising a body having a valve chamber therein, the body being adapted to be disposed with the valve chamber at a higher lever than said sump, a conduit having one end connected to said valve chamber and having its other end located within said sump, the body having associated therewith a movable abutment subject to the opposing pressures of the fluid in a chamber open to said system and of the fluid in a chamber, a passage through which fluid may flow between said chamber and said system at a restricted rate, and valve means operated by said abutment and controlling a discharge passage through which liquid supplied to said valve chamber may be released therefrom.

5. In an automatic drain valve device for use with a fluid pressure system having a sump therein in which liquid may collect, the drain valve device comprising a body having a valve chamber therein, the body being adapted to be disposed with the valve chamber at a higher level than said sump, a conduit having one end connected to said valve chamber and having its other end located within said sump, the body having associated therewith a movable abutment subject to the opposing pressures of the fluid in an operating chamber open to said system and of the fluid in a control chamber, a passage through which fluid may flow between said control chamber and said system at a restricted rate, valve means operated by said abutment and controlling a discharge passage through which liquid supplied to said valve chamber may be released therefrom, and means responsive to the level of the liquid in said system for controlling communication from said sump to said valve chamber through said conduit.

BURTON S. AIKMAN.

CERTIFICATE OF CORRECTION.

Patent No. 2,177,510. October 24, 1939.

BURTON S. AIKMAN.

It is hereby certified that error appears in the printed specification of the above numbered patent requiring correction as follows: Page 5, second column, lines 27, 28 and 29, claim 4, strike out the words "a chamber open to said system and of the fluid in a chamber, a passage through which fluid may flow between said" and insert instead an operating chamber open to said system by way of a passage independent of said sump and of the fluid in a control chamber, a passage independent of said sump through which fluid may flow between said control; and that the said Letters Patent should be read with this correction therein that the same may conform to the record of the case in the Patent Office.

Signed and sealed this 16th day of January, A. D. 1940.

(Seal)

Henry Van Arsdale,
Acting Commissioner of Patents.